Feb. 4, 1969  A. A. RUSSELL, JR., ET AL  3,425,275
AUXILIARY METERING APPARATUS
Filed April 3, 1967
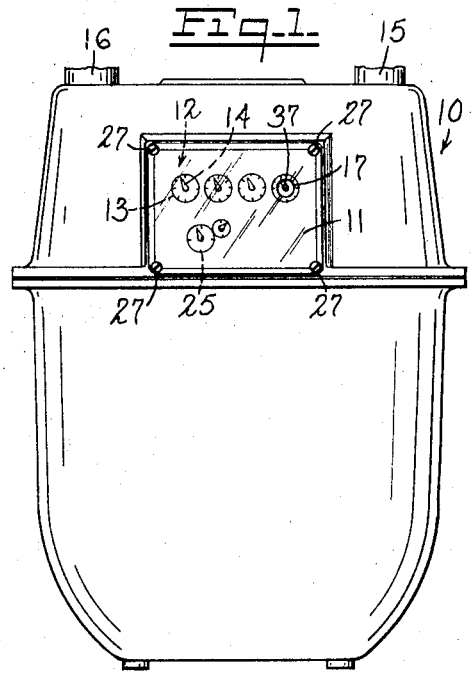
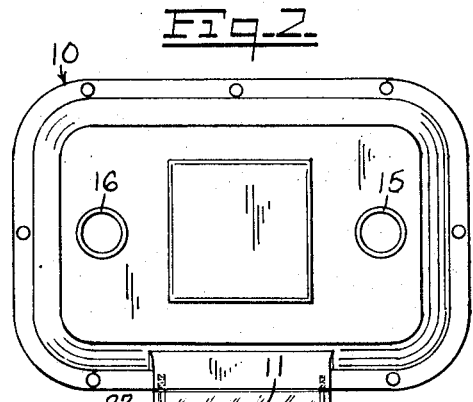
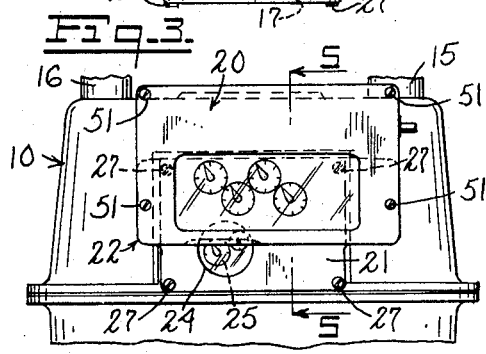
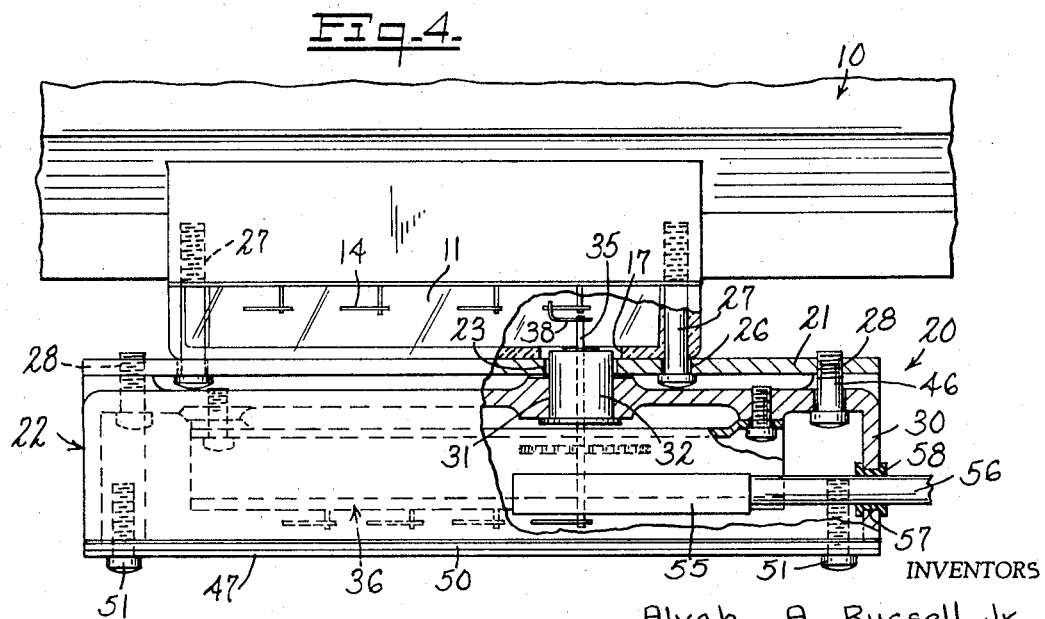
INVENTORS
Alvah A. Russell, Jr.
Howard L. Pearson
BY De Lio and Montgomery
ATTORNEYS

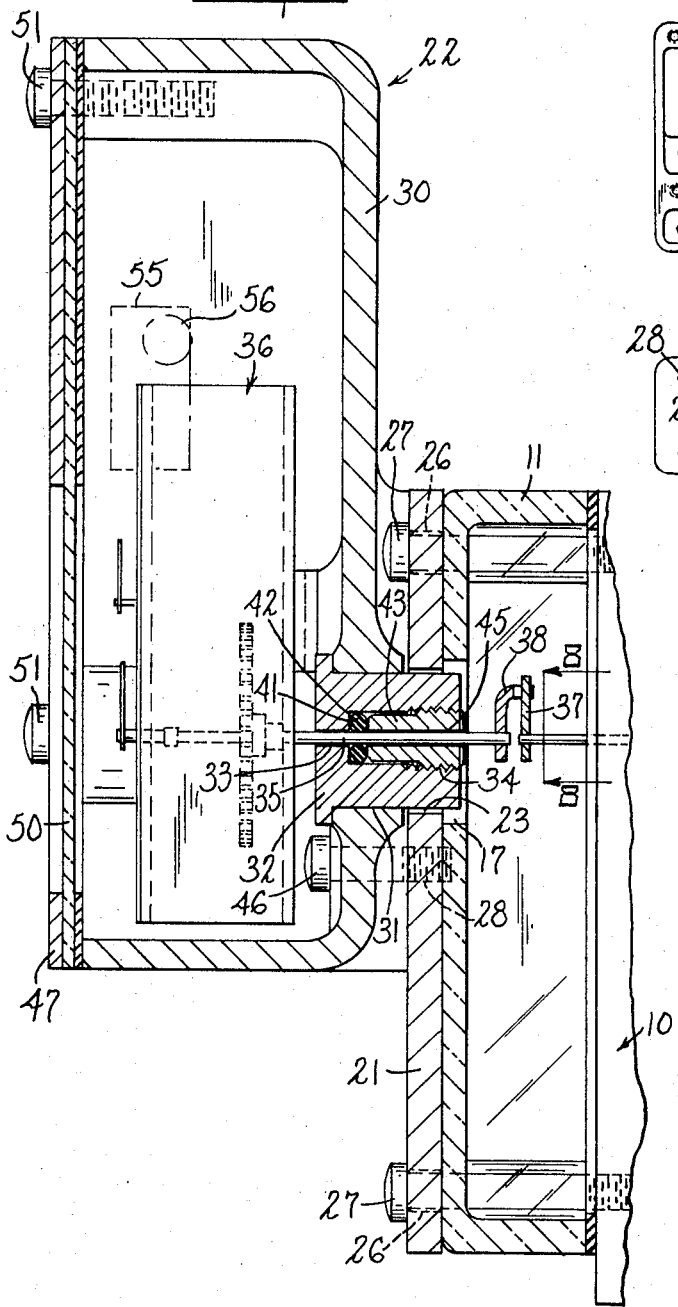
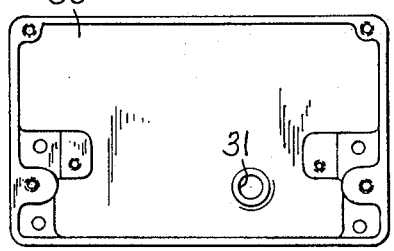
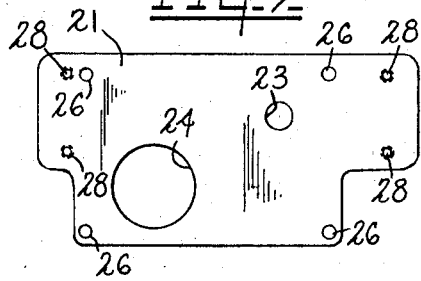
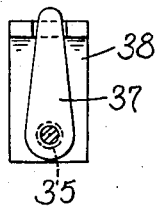

United States Patent Office 3,425,275
Patented Feb. 4, 1969

3,425,275
AUXILIARY METERING APPARATUS
Alvah A. Russell, Jr., Glastonbury, and Howard L. Pearson, Durham, Conn., assignors to Ripley Company, Inc., Middletown, Conn., a corporation of New York
Filed Apr. 3, 1967, Ser. No. 627,993
U.S. Cl. 73—195                                    1 Claim
Int. Cl. G01f 1/00

ABSTRACT OF THE DISCLOSURE

An auxiliary metering apparatus for mounting on a gas meter assembly, which includes a sealed enclosure for supporting an auxiliary meter therein, a shaft supported in a bore in said enclosure and passing therefrom, the shaft being adapted for coupling between the auxiliary meter and a meter of the gas meter assembly, an O-ring in the bore positioned about the shaft, and a plug member having a bore therein for supporting the shaft, said bore applying pressure to said O-ring to force it tightly over the shaft.

---

This invention relates generally to an auxiliary metering unit and more particularly to a unit for use with the usual type of commercial or residential gas meter assembly. Specifically, the invention relates to the novel construction of an auxiliary metering unit enclosure and support for an auxiliary metering device adapted to be used in conjunction with existing gas meter assemblies.

In order to automate existing utility meter reading systems, without replacing existing gas meters, it is necessary for present-day gas meters to be adapted to operate with auxiliary metering devices to provide electrical signals indicative of readings being recorded by the existing gas meters. Safety requires that the electrical portion of the auxiliary readout device of the gas meter be completely segregated from the gas meter unit itself. In operation, the existing gas meter generally develops small gas leaks which are vented into the atmosphere through vents in the gas meter assembly. Because of this, it is required that if electrical circuitry is incorporated for use with a gas meter, it must be completely isolated therefrom so as to prevent any chance of a gas explosion occurring.

In view of the foregoing, this invention provides a new and improved enclosure adapted for mounting on the commercially available gas meter. The enclosure is adapted to have mounted therein an auxiliary metering unit such as disclosed in U.S. Patent 3,195,814 issued July 20, 1965, to Robert A Steinkamp. The enclosure of this invention is constructed such that a shaft may be used to interconnect the auxiliary metering device of the aforementioned patent or the like, with a metering mechanism used with commercially available gas meters. This has been accomplished by applicant in such a manner that the enclosure for the auxiliary metering device is completely sealed off from any gas which may accumulate in or leak from the gas meter itself.

Accordingly, it is an object of this invention to provide a new and improved means which is economical to use, does not require change in the gas meter mechanism, and may be adapted for use with commercially available gas meters with a minimum of alteration thereof.

Another object of this invention is to provide an enclosure device which completely prevents gas from accumulating in the vicinity of the electrical portions of the auxiliary metering device.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claim.

For a fuller understanding of the invention, reference is had to the following description, taken in connection with the accompanying drawings, in which:

FIG. 1 is a front elevational view of a commercially available gas meter assembly;

FIG. 2 is a top view of FIG. 1;

FIG. 3 is a partial view similar to FIG. 1 with the auxiliary unit enclosure attached thereto;

FIG. 4 is a top view of FIG. 3;

FIG. 5 is a sectional view taken along line 5—5 of FIG. 3;

FIG. 6 is a front view of the auxiliary enclosure;

FIG. 7 is a view of a plate for supporting the auxiliary enclosure on an existing gas meter assembly; and FIG. 8 is a sectional view take along line 8—8 of FIG. 5

Referring to FIGS. 1 and 2, there is shown a standard commercially available gas meter assembly 10, having a front translucent cover 11 placed over the meter mechanisms generally shown at 12. The meter mechanisms are provided with dials shown at 13 and pointers 14 for recording the amount of gas being utilized. The gas flows into the system by way of an inlet pipe 16 and flows out of the meter by way of an outlet pipe 15.

In order to adapt the gas meter assembly 10 for use with the auxiliary gas metering unit according to the invention, an opening 17 is formed in the cover 11. Since the cover 11 is generally of plastic or glass, standard cutting techniques may be utilized for forming said opening.

With reference to FIGS. 1–8, in particular to FIGS. 3–8, an auxiliary metering unit according to this invention is generally shown at 20 and comprises a plate 21 for mounting the enclosure unit 22 on the gas meter assembly 10. The plate 21 is provided with an opening 23 which will be aligned with the pointer 37 and its shaft 35. An enlarged opening 24 is also provided in the preferred embodiment according to this invention, for permitting certain of the calibration dials 25 (FIG. 1 or 3) of the gas meter to be observed, if desired. The plate 21 is also provided with holes 26 for fastening it to bolts 27 of the cover 11.

The plate 21 is further provided with threaded holes 28 for mounting an auxiliary metering unit enclosure shown at 30. The enclosure 30 is formed with a bore 31 in which is mounted a press-fitted insert or sleeve member 32 having a bore 33 and a partially threaded bore 34 formed therein. The bore 33 is adapted to permit a shaft 35 to pass therethrough, said shaft being coupled for driving an auxiliary metering unit shown at 36, which may be of the type disclosed in the aforementioned patent, from the pointer 37 of the gas meter. The shaft 35 is coupled to the pointer 37 by a curved arm 38 (FIGS. 5 and 8). Positioned in the enlarged bore 34 is an O ring 41 of rubber or plastic material which is seated against a flange 42. The O ring 41 is forced over the shaft 35 in a sealing manner by the provision of a threaded plug 43 which applies pressure against it. The plug 43 includes a bore 45 for permitting shaft 35 to pass therethrough, although it should be understood that the bore 45 could be utilized to support the shaft 35 when required. It should also be understood that the enclosure 30 and insert member 32 could be cast as a one-piece assembly, if desired.

The enclosure 30 is supported from the plate 21 by bolts shown at 46 and is provided with a cover plate 47 sealed thereto, said plate 47 having a transparent viewing plate 50 and being supported on the enclosure 30 by bolts 51.

FIGS. 4 and 8 more particularly show the meter 36 connected to an external readout connector (not shown) by a connector 55 which contacts the electrical contacts of the meter 36. The connector 55 has an electrical cable 56 coupled thereto which passes through an opening 57 in the enclosure 30, said cable support in a rubber seal 58.

It will thus be seen that the objects set forth above, among those made apparent from the preceding description, are efficiently attained and since certain changes may be made in the above construction without departing from the spirit and scope of the invention, it is intended that all matter contained in the foregoing description or shown in the accompanying drawings shall be interpreted as illustrative, and not in a limiting sense.

It is also to be understood that the following claim is intended to cover all the generic and specific features of the invention herein described and all statements of the scope of the invention which, as a matter of language, might be said to fall therebetween.

What is claimed is:

1. In combination with a gas meter assembly having a casing which houses a metering mechanism having a pointer mounted on a rotating shaft and in which there is provided a casing cover having a see-through window, the cover being mounted to the casing by a plurality of bolts, the improvement characterized in that there is provided an opening through said window in line with the position of the pointer and said shaft, a plate supported on the cover and having an opening in line with the opening in the window, an auxiliary metering casing supported on said plate, a press fitted sleeve member having a bore formed therein supported in a bore formed in said auxiliary metering casing, said sleeve member extending into the opening formed in the plate and window, an auxiliary metering mechanism supported in said auxiliary metering casing and having a rotatable shaft as a part thereof, the rotatable shaft of said auxiliary metering mechanism positioned substantially in line with the shaft of said metering mechanism, said auxiliary metering shaft extending through the bore formed in the sleeve and having an arm for engaging the pointer so as to rotate therewith, an O-ring mounted in said bore of said sleeve and positioned about the shaft passing through the bore, and a plug member provided in the bore of said sleeve to force said O-ring into close sealing contact with the shaft passing therethrough.

References Cited

UNITED STATES PATENTS

| | | | |
|---|---|---|---|
| 2,826,069 | 3/1958 | Hague et al. | 73—272 |
| 2,854,848 | 10/1958 | Hood | 73—273 |
| 2,997,877 | 8/1961 | Bithell | 73—272 |
| 3,046,783 | 7/1962 | Bills | 73—272 |
| 3,195,814 | 7/1965 | Steinkamp | 235—113 |
| 3,216,252 | 11/1965 | Chapman et al. | 73—272 |

JAMES J. GILL, *Primary Examiner.*

R. S. SALZMAN, *Assistant Examiner.*

U.S. Cl. X.R.

73—272, 273 274; 235—113